United States Patent
Looney et al.

(10) Patent No.: US 8,911,630 B2
(45) Date of Patent: Dec. 16, 2014

(54) PROCESS FOR TREATING WASTE WATER HAVING LOW CONCENTRATIONS OF METALLIC CONTAMINANTS

(75) Inventors: Brian B. Looney, Aiken, SC (US); Margaret R. Millings, N. Augusta, SC (US); Ralph L. Nichols, N. Augusta, SC (US); William L. Payne, Martinez, GA (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 903 days.

(21) Appl. No.: 12/319,966

(22) Filed: Jan. 14, 2009

(65) Prior Publication Data

US 2010/0176065 A1 Jul. 15, 2010

(51) Int. Cl.
- *C02F 1/42* (2006.01)
- *C02F 1/44* (2006.01)
- *C02F 1/48* (2006.01)
- *B01D 15/00* (2006.01)
- *C02F 1/68* (2006.01)
- *C02F 1/28* (2006.01)
- *C02F 101/20* (2006.01)
- *C02F 101/22* (2006.01)

(52) U.S. Cl.
CPC ............... *C02F 1/683* (2013.01); *C02F 1/286* (2013.01); *C02F 2101/20* (2013.01); *C02F 2101/22* (2013.01); *C02F 2209/003* (2013.01); *C02F 2209/06* (2013.01); *C02F 2209/40* (2013.01)
USPC ...... 210/681; 210/639; 210/748.16; 210/709; 210/743

(58) Field of Classification Search
CPC ................. C02F 1/705; C02F 2101/20; C02F 2101/303; C02F 2101/10
USPC ......................... 210/696, 698, 638, 639, 749, 210/747.1–747.8, 681, 709, 748, 743, 147; 502/401
See application file for complete search history.

(56) References Cited

U.S. PATENT DOCUMENTS

| | | | |
|---|---|---|---|
| 2,868,724 A * | 1/1959 | Zech | 210/698 |
| 3,054,746 A * | 9/1962 | Gaden, Jr. et al. | 210/698 |
| 3,872,002 A | 3/1975 | Musgrove | |
| 3,932,494 A | 1/1976 | Yoshida et al. | |
| 4,081,403 A | 3/1978 | Takegami et al. | |
| 4,654,322 A | 3/1987 | Holbein et al. | |
| 4,746,442 A | 5/1988 | Calemma et al. | |
| 4,752,398 A | 6/1988 | Holbein et al. | |
| 5,043,077 A * | 8/1991 | Chandler et al. | 210/698 |
| 5,112,501 A | 5/1992 | Rausa et al. | |
| 5,302,287 A * | 4/1994 | Losack | 210/612 |
| 5,415,778 A | 5/1995 | Zanin et al. | |
| 5,520,482 A | 5/1996 | Oeste et al. | |
| 5,906,960 A * | 5/1999 | Sanjay et al. | 502/401 |

(Continued)

OTHER PUBLICATIONS

Markich et al. "The Effects of pH and Dissolved Organic Carbon on the Toxicity of Cadmium and Copper to a Freshwater Bivalve: Further SUpoort for the Extended Free Ion Activity Model". 2003. Arch. Environ. Contam. Toxicol. vol. 45, pp. 479-491.*

*Primary Examiner* — Ana Fortuna
(74) *Attorney, Agent, or Firm* — J. Bennett Mullinax LLC

(57) ABSTRACT

A process for treating waste water having a low level of metallic contaminants by reducing the toxicity level of metallic contaminants to an acceptable level and subsequently discharging the treated waste water into the environment without removing the treated contaminants.

10 Claims, 2 Drawing Sheets

(56) References Cited

U.S. PATENT DOCUMENTS

| | | |
|---|---|---|
| 6,001,769 A | 12/1999 | Citterbart et al. |
| 6,143,693 A * | 11/2000 | Irving et al. .................. 503/201 |
| 6,303,037 B1 * | 10/2001 | Tamura et al. ................ 210/652 |
| 6,663,646 B1 * | 12/2003 | Shah ............................. 606/192 |
| 2006/0058566 A1 * | 3/2006 | Shulgin et al. ................ 588/316 |
| 2006/0120805 A1 * | 6/2006 | Zhuang ....................... 405/128.5 |
| 2011/0031188 A1 * | 2/2011 | Perminova et al. ........... 210/747 |

* cited by examiner

PROCESS FOR TREATING WASTE WATER HAVING LOW CONCENTRATIONS OF METALLIC CONTAMINANTS

FEDERALLY SPONSORED RESEARCH

The U.S. Government has rights in this invention pursuant to contract number DE-AC 09-96SR18500 between the U.S. Department of Energy and Washington Savannah River Company LLC.

FIELD OF THE INVENTION

This invention relates to a process for treating waste water having low concentrations of metallic contaminants so that the water may be safely discharged into the environment. More particularly, the invention relates to a process for reducing the toxicity of metallic contaminants in waste water.

BACKGROUND OF THE INVENTION

The regulations and laws of the United States and many other countries have recently required further reduction of contaminants in waste water, particularly, metallic contaminants. The permitted levels of these contaminants can only be expected to be decreased even more in the future. Because of these environmental concerns, numerous chemical, biological, physical and electrical methods for removing contaminants, particularly metallic contaminants, have been proposed and developed. Some of these methods have utilized humic acids and similar natural organic materials. For example, in U.S. Pat. Nos. 5,906,960 and 6,143,692 to Sanjay et al. the use of solid humic material as an absorbent to bind metals or liquid humic materials to leach and recover metals in a chelated form from contaminated solids is described. The humic materials are selected from the group consisting of soluble humates, insoluble humates, insolubilized humic acid and mixtures thereof. In the '692 patent contaminated ground water is treated by using a cross-linked humic acid solid (HUMASORB-CS™) placed into a cartridge or a trench. In this case, the solid humate removes both metal ions and organics from the water in one step.

In another patent, namely, U.S. Pat. No. 4,081,403 to Takegami et al. the use of solid humic materials as an absorbent for the treatment of waste water is also described. The removal of copper from a liquid medium using surface modified inorganic and organic solid carriers is described in U.S. Pat. No. 4,752,398 to Holbein et al. The possible organic solid carriers in the '398 patent include solid humic materials.

In another patent, U.S. Pat. No. 6,001,769 to Citterbart et al., a humic acid solution is used to elute or extract contaminants from subsurface solids.

In general, the foregoing patents which may be considered to be representative of a larger number of prior art patents, all are directed to using humic acid or its derivatives to either: 1) bind the contaminant to a solid absorbent to reduce the contaminant remaining in the waste water, or 2) to rapidly extract the contaminant from contaminated solids to reduce the potential for future leaching into waste water. In other words, the processes described in the foregoing patents are successful if the contaminants in the converted forms can be reliably removed from the waste water in a solid form or can be rapidly removed from contaminated solids to mitigate future contamination of water contacting the treated solids. However, it is a general object of the present invention to convert low concentrations of metallic contaminants in water to less toxic forms and to reduce their toxicity to an acceptable level without the need for removing the metal from the water or from contaminated solids. This and other objects are achieved by the invention described below.

SUMMARY OF THE INVENTION

In one aspect, the present invention is a process for treating waste water having low concentrations of metallic contaminants comprising the steps of: reducing the toxicity of the metal contaminants in the waste water to a predetermined level; discharging the waste water; and monitoring key parameters to provide the data for process control. The process is controlled based on biogeochemical parameters, such as pH, that influence metal toxicity in the waste water and the amount of water, or flow rate, requiring treatment.

In another aspect in the process of the invention, the toxicity of the contaminants is reduced but such contaminants are not removed from the waste water.

In still another aspect of the present invention, the toxicity level of the contaminants in the waste water is reduced by utilizing amendments containing dissolved organic material, preferably dissolved organic carbon containing soluble humic acid and related compounds that bind metal ions in solution. As used herein "amendment" is an organic material such as the extracted humic acid product called "humate" that is used to mitigate toxicity. Simplistically, the organic amendment binds the toxic material that animals or humans might or would take up so there is not enough free contaminant left to harm animals or humans.

In another aspect of the present invention, the metallic contaminant may be copper, silver, cadmium, chromium, zinc, nickel, beryllium, thallium, aluminum, tin, cobalt or lead.

In one specific embodiment, the metallic contaminant is copper and the amendment is dissolved organic material containing humic acid.

In a further aspect the invention is a system for performing the above process.

As used herein, "low" concentration is a concentration of contaminant metal that can be detoxified using humic acid and related compounds. For copper, for example, this can mean concentrations up to about 50 µg/L.

DESCRIPTION OF THE DRAWINGS

The drawings submitted herewith and made a part of this disclosure are provided by way of illustration and not by way of limitation. In the drawings.

DETAILED DESCRIPTION

In treating waste water containing low concentrations of metallic contaminants, the present invention is directed to reducing the toxicity level of the contaminants rather than removing them. This process uses commercially available materials such as soluble dissolved organic carbon to sequester contaminant metal making them unavailable for biological uptake thus detoxifying the surface water discharge to meet regulatory requirements without the need for high-cost traditional metal removal technologies. The DOC may contain humic acid or other forms of dissolved organics that complex metals. In addition, the Biotic Ligand Model (BLM), or similar mechanistic model is used to estimate toxicity reduction and target amendment dose. Importantly such models extend the traditional "hardness" based on toxicity estimates to include other biogeochemical parameters including cation concentrations ($K^+$, $Na^+$, $Ca^{+2}$, $Mg^{+2}$ etc.), pH, dissolved organic carbon and the percentage of that carbon contributed by humic acid. The DOC in natural waste water typically contains about 10% humic acid but various potential amendments can contain a much higher humic acid fraction (up to 100%). For many contaminant metals, the literature indicates that total DOC, humic acid percentage, and pH are the primary factors that determine toxicity in waste water.

Figure 2A:
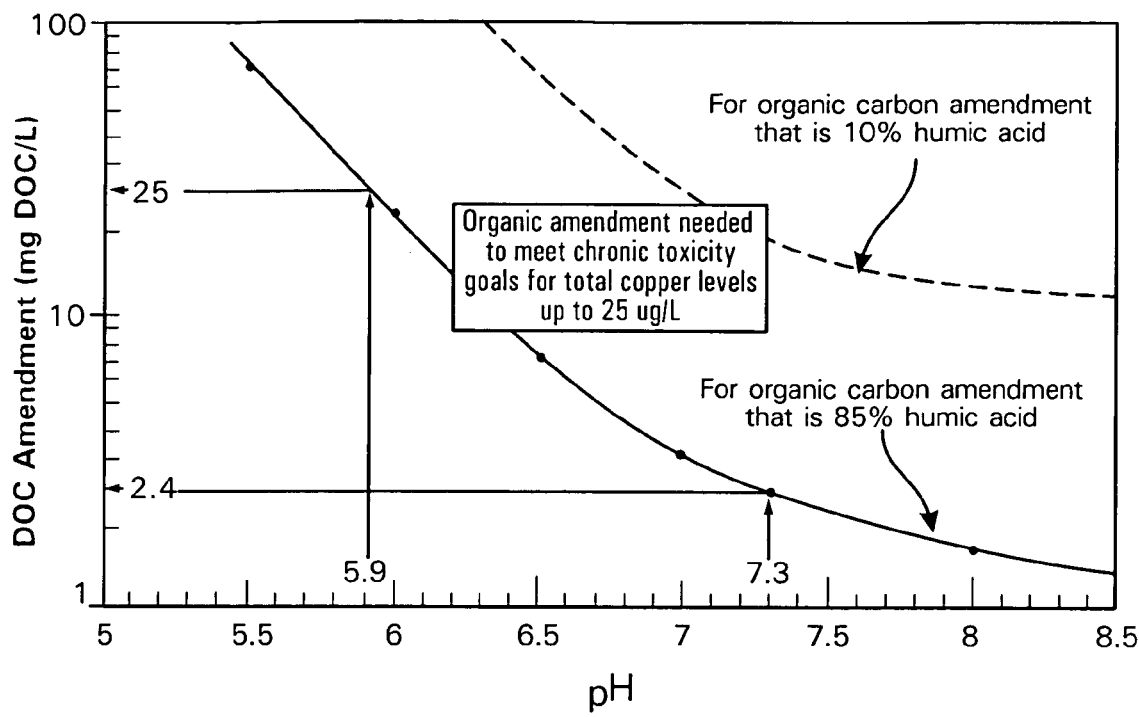
FIG. 2a represents the DOC requirement as a function of pH for amendments with varying humic acid content.

Biotic Ligand Models are available from several suppliers and the present invention is not limited to a specific model. However, one preferred model for the present invention is Windows Interface Version 1.1.2. by HydroQual, Inc. in which the parameters are based on real-world outfall data. In an example using the BLM model, a series of runs was performed in which pH, DOC, and the presence of the DOC contributed by humic acid were varied, and all other chemical parameters were fixed. These particular parameters were varied because they typically control contaminant speciation and thus contaminant toxicity. FIG. 2a provides summary information resulting from running 54 scenarios with the BLM for an example wastewater. The figure highlights the benefits of selecting an amendment for toxicity reduction that has a high soluble humic acid content. Also, because humic acid is recalcitrant and is not easily used as a food source in the ecosystem, this type of carbon amendment minimizes oxygen demand and the related potential adverse impacts of adding DOC. Research identified soluble humic acid isolated by potassium hydroxide extraction as an ideal amendment and its chemistry was evaluated. This material (soluble humic acid, also known as potassium humate) is commercially available as an organic agricultural amendment normally used to enhance the growth of tomatoes, lettuce, rice and other foods and also, non-food crops. To create conditions that effectively mitigate the potential for copper toxicity in this example, sufficient carbon is needed to raise the chronic water quality criteria above the maximum expected copper levels for the wastewater, about 25 micrograms of copper per liter. For the reference water chemistry conditions, notably pH 7.3, about 2 to 3 milligrams of DOC addition from soluble humic acid would be sufficient.

Figure 2B:
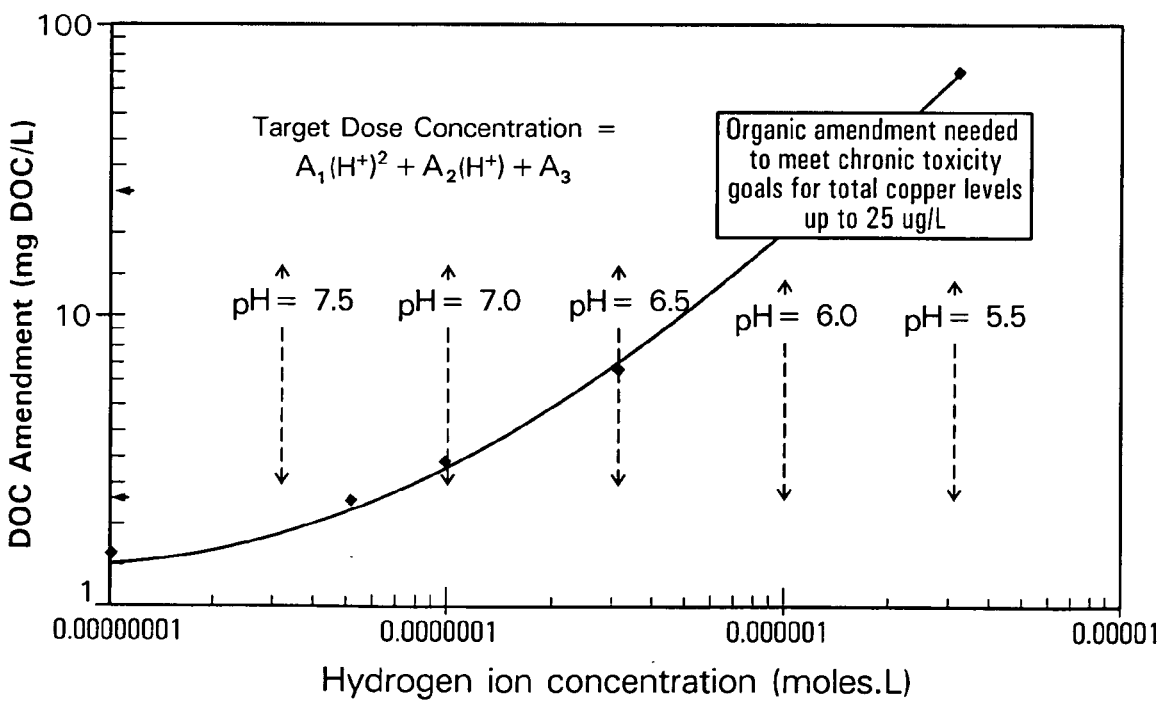
FIG. 2b represents site-specific DOC (dissolved organic carbon) requirement for an example wastewater and amendment showing a simplified polynomial equation that can be used for process control.

Significantly, the BLM estimated toxicity is a function of several inter-acting parameters, such as pH level, hardness, organic carbon, and various metals and anions that influence contaminant speciation. For example, the calculated toxicity criteria were quite sensitive to changes in pH, resulting in more restrictive values such as high DOC requirements when a lower pH such as pH <6, was used in the model. Importantly, and a key feature of this process, at DOC additions of about 10 to 20 mg DOC/L the base, potassium hydroxide, in the soluble humic acid material can raise the pH in a beneficial manner and can serve to limit the maximum dose needed to reasonable values. The graph in FIG. 2a shows the relationship of DOC requirement to pH for organic carbon amendments that contain 10% and 85% humic acid based on mitigating toxicity for total copper concentration up to 25 μg/L. Note that the relationship is nonlinear. At higher pH, significantly lower DOC doses are required. For example, when using a DOC amendment that is 85% humic acid at pH 7.3, a dose of 2.4 mg DOC/L is needed. At pH 5.9 the DOC dose requirement increases to 25 mg DOC/L. FIG. 2b shows an example of the relationship between DOC and pH for a specific amendment and a specific waste water. The polynomial fit to hydrogen ion provides a simplified mathematical equation that would provide an easily programmable control equation for this particular amendment of interest and site-specific detoxification goals. In this case, the required target dose and associated metering pump flow rate are defined by the following equations:

$$\text{Target Dose Concentration} = C_{target}$$
$$= A_1(H^+)^2 + A_2(H^+) + A_3$$
$$= A_1(10^{-pH})^2 + A_2(10^{-pH}) + A_3$$

$$\text{Metering Pump flow rate} = Q_{pump}$$
$$= (Q_{outfall} * C_{target}) / C_{stock}$$

Where:
$A_1$, $A_2$ and $A_3$ are site specific constants determined using the biotic ligand model or similar calculations
$C_{target}$ is the desired amendment concentration in the treated wastewater (mg DOC/L)
$C_{stock}$ is the amendment concentration in the storage tank (mg DOC/L)
$Q_{pump}$ is the metering pump flow rate (L/min)
$Q_{outfall}$ is the outfall flow rate (L/min)

Figure 1:
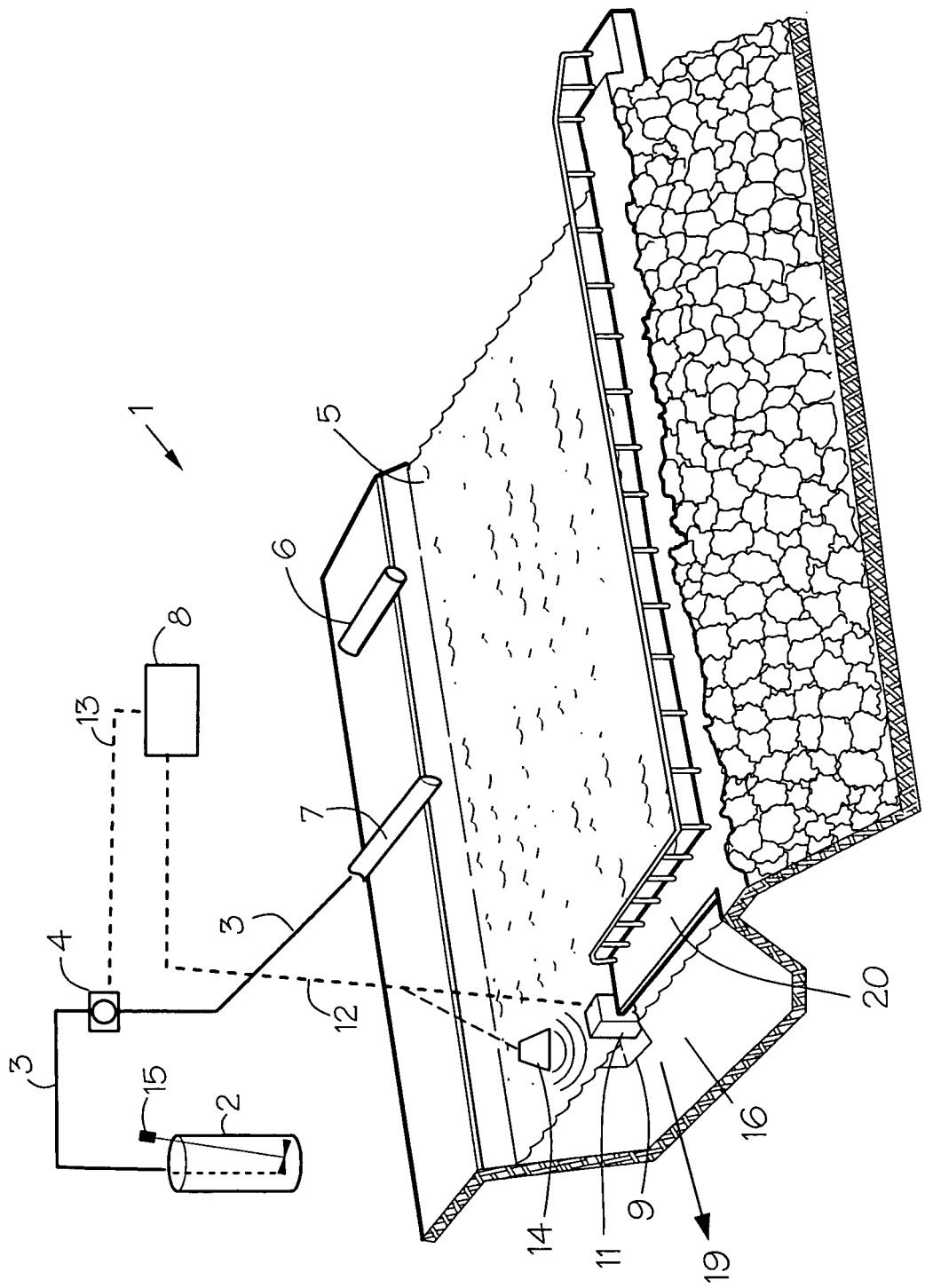
FIG. 1 is a schematic representation showing the discharge and monitoring of treated waste water; according to one embodiment of the present invention; and, FIGS. 2a and 2b are graphs showing the dissolved organic carbon (DOC) required to mitigate toxicity for total copper up to 25 µg/L.

Turning now to FIG. 1, a preferred embodiment and best mode of the invention will be described. In FIG. 1, a schematic representation designated by the number, "1", of a process for treating waste water having low concentration of metallic contaminants is shown and for discharging the water into flowing stream 16 as the water flows through mixing zone 5. A stock solution of dissolved organic carbon containing potassium humate, soluble humic acid, or similar compound, is contained in container 2 and the stock can be mixed using a mechanical or hydraulic mixer 15. The solution can be removed as required through pipe 3 under action of the variable speed pump 4. Upon leaving the container 2, the humic acid or treating solution is pumped through pump 4 to the discharge nozzle 7 and into mixing zone 5.

The flow in stream 16 is provided completely, or in part, by the contaminated wastewater entering at the upstream discharge delivery pipe 6. The contaminated water and treating solution combine by natural hydraulic processes in mixing zone 5 and the resulting solution flows through the discharge weir or flume 9, and from there flows downstream in the direction of arrow 19. A key parameter important in determining toxicity of the outfall water is pH level. Monitor 11 which is positioned within flow guide or flume 9 detects the pH level of the outflow water and sends this information back through a data transfer system 12 to controller 8. The detector 11 can be accessed from platform 20 for maintenance. Controller 8 also monitors the water moving through the mixing zone 5 by means of the water flow monitor 14 with information transferred via the data transfer system 12. Controller 8 processes the measured input information (pH level and flow of waste water) and regulates the flow of treating solution to lower the toxicity level below a predetermined acceptable level by adjusting the signal sent on line 13 to vary the speed of pump 4 and the resulting amount of humic acid added into zone 5 through nozzle 7. Thus, water at a safe and environmentally acceptable toxicity level is discharged into the environment through the outfall.

After reading the foregoing description of our invention, numerous modifications and additional embodiments may become apparent to those skilled in the art but our invention is limited only by the scope of the claims which follow.

What is claimed is:

1. A process for treating waste water having low concentration of metallic contaminants before discharging the water into the environment consisting of the steps of:
   (a) monitoring biogeochemical parameters that indicate the toxicity of the metal contaminant in the waste water,
   (b) treating the waste water using an amendment having a 0 acid compound to reduce the toxicity of the metallic contaminants therein to a predetermined level without removing of said contaminant from said waste water; and
   (c) discharging the treated waste water.

2. The process of claim 1 wherein step (b) is performed by the steps of:
   (i) determining the maximum possible concentration of contaminant metal in said waste water based on the monitoring data and information about the waste water source;
   (ii) utilizing a biotic ligand model to determine the quantity of amendment required to mitigate the toxicity of the contaminant to that predetermined level.

3. The process of claim 2 wherein the results of the biotic ligand model are reduced to a site-specific amendment dose equation where the resulting calculated dose is combined with the water flow information to control a metering pump in response to field sensors and measurements.

4. The process of claim 3 wherein said site-specific dose equation is a polynomial based on pH.

5. The process of claim 1 wherein the metallic contaminant is a metal or a compound of a metal selected from the group consisting of: copper, silver, cadmium, chromium, zinc, nickel, beryllium, thallium, aluminum, tin, cobalt and lead.

6. The process of claim 1 wherein said amendment is dissolved organic carbon containing potassium humate.

7. The process of claim 5 wherein said metallic contaminant is copper and said amendment is dissolved organic carbon containing potassium humate.

8. The process of claim 5 wherein said metallic contaminant is copper.

9. The process according to claim 5 wherein the level of the copper within the discharge stream is equal to or less than 50 µg/L.

10. A process for reducing the toxicity of metallic contaminants within a discharge stream prior to release into the environment consisting of the steps of:
    monitoring the toxicity level of a metal contaminant within a discharge stream; introducing dissolved organic carbon containing potassium humate to the discharge stream;
    allowing the dissolved organic carbon containing potassium humate to bind to the contaminant, thereby reducing the bioavalability of the contaminant; and
    releasing the discharge stream having the contaminant bound to the amendment into the environment, wherein the toxicity of the contaminant is reduced by binding to the dissolved organic carbon containing potassium humate.

\* \* \* \* \*